United States Patent
Hybord et al.

(10) Patent No.: US 11,165,227 B2
(45) Date of Patent: Nov. 2, 2021

(54) POWER DISTRIBUTION UNIT, SUCH AS A FUSE BOX FOR A VEHICLE

(71) Applicant: VOLVO TRUCK CORPORATION, Gothenburg (SE)

(72) Inventors: Christophe Hybord, Chassieu (FR); Rémi Barrellon, Simandres (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/964,681

(22) PCT Filed: Mar. 21, 2018

(86) PCT No.: PCT/EP2018/057141
§ 371 (c)(1),
(2) Date: Jul. 24, 2020

(87) PCT Pub. No.: WO2019/179614
PCT Pub. Date: Sep. 26, 2019

(65) Prior Publication Data
US 2020/0412106 A1    Dec. 31, 2020

(51) Int. Cl.
*H02B 1/18*        (2006.01)
*B60R 16/03*       (2006.01)
(Continued)

(52) U.S. Cl.
CPC ............... *H02B 1/18* (2013.01); *B60R 16/03* (2013.01); *H01H 85/143* (2013.01);
(Continued)

(58) Field of Classification Search
CPC .... H02B 1/18; H02B 1/20; H02B 1/48; B60R 16/03; H01H 85/143; H01H 85/165; H01H 2085/208
(Continued)

(56) References Cited

U.S. PATENT DOCUMENTS 2,308,596 A * 1/1943 Drury ................. H01H 85/202
                                                      337/187
3,744,003 A * 7/1973 Dipace .................. H01H 85/20
                                                      439/638
(Continued)

FOREIGN PATENT DOCUMENTS

DE    202004002191 U1    4/2004
EP         1548882 A1    6/2005

OTHER PUBLICATIONS

International Search Report and Written Opinion dated Jan. 4, 2019 in corresponding International PCT Application No. PCT/EP2018/057141, 14 pages.

*Primary Examiner* — Anatoly Vortman
(74) *Attorney, Agent, or Firm* — Venable LLP; Jeffi A. Kaminski

(57) ABSTRACT

The invention relates to a power distribution unit (1), such as a fuse box for a vehicle, for providing a protected electrical connection between a power supply cable and a plurality of distribution cables (7). The unit comprises a housing (2) and, received in said housing: —a bus bar (5) configured to be connected to the power supply cable; —a plurality of fuses (10), each fuse comprising a body (15), a first end portion (11) configured to be connected to the bus bar (5), and a second end portion (12) configured to be connected to a distribution cable (7); —at least one retainer (20) for maintaining the bus bar (5) in position with respect to the housing (2); —at least one positioner (40) for positioning the fuse first end portion (11) relative to the bus bar (5) along directions (X, Y) substantially parallel to the bus bar; —a biasing member (30) configured to urge the fuse first end portion (11) towards the bus bar (5), to cause the fuse first end portion to remain in contact with the bus bar.

18 Claims, 3 Drawing Sheets

(51) Int. Cl.
*H02B 1/48* (2006.01)
*H02B 1/20* (2006.01)
*H01H 85/143* (2006.01)
*H01H 85/165* (2006.01)
*H01H 85/20* (2006.01)

(52) U.S. Cl.
CPC ............ *H01H 85/165* (2013.01); *H02B 1/20* (2013.01); *H02B 1/48* (2013.01); *H01H 2085/208* (2013.01)

(58) Field of Classification Search
USPC ........................................................ 361/624
See application file for complete search history.

(56) References Cited

U.S. PATENT DOCUMENTS

| | | | | |
|---|---|---|---|---|
| 3,858,058 A * | 12/1974 | Tillson | ................... | H01H 85/24 439/831 |
| 4,842,534 A * | 6/1989 | Mobley | .............. | H01H 85/2035 337/191 |
| 4,846,733 A * | 7/1989 | Baisz | ................. | H01H 85/2035 439/620.33 |
| 5,088,940 A * | 2/1992 | Saito | .................... | H01H 85/205 439/620.34 |
| 5,328,392 A * | 7/1994 | Lin | ....................... | H01H 85/203 439/620.27 |
| 5,362,253 A * | 11/1994 | Lin | ....................... | H01R 4/5025 439/462 |
| 5,438,310 A * | 8/1995 | Ikari | ...................... | H01H 85/20 337/186 |
| 5,551,894 A * | 9/1996 | Lin | .................... | H01H 85/2045 439/620.27 |
| 5,618,209 A * | 4/1997 | Lin | ....................... | H01H 85/205 439/620.26 |
| 5,643,693 A * | 7/1997 | Hill | ....................... | H01M 50/20 429/121 |
| 5,731,944 A * | 3/1998 | Yasukuni | ............... | H01H 85/20 361/104 |
| 5,886,611 A * | 3/1999 | Schaller | ............... | H01H 85/044 337/189 |
| 6,162,097 A * | 12/2000 | Liang | .................... | H01H 85/202 439/218 |
| 6,227,913 B1 * | 5/2001 | Davis | ....................... | H02B 1/18 439/620.26 |
| 6,233,160 B1 * | 5/2001 | Shockley | ................. | H02B 1/28 361/626 |
| 6,309,253 B1 * | 10/2001 | Tsai | .................... | H01H 85/2045 439/620.27 |
| 6,326,878 B1 * | 12/2001 | Liang | .................... | H01H 85/202 337/214 |
| 6,396,380 B1 * | 5/2002 | Girke | ................... | H01H 85/044 337/189 |
| 6,545,861 B1 * | 4/2003 | Hayes | ...................... | H02B 1/18 174/536 |
| 6,753,754 B1 * | 6/2004 | Black | .................. | H01H 85/205 337/187 |
| 7,592,892 B2 * | 9/2009 | Ito | ........................ | H01H 85/045 337/159 |
| 7,663,465 B2 * | 2/2010 | Matsumoto | .......... | H01H 85/044 337/187 |
| 2005/0026471 A1 | 2/2005 | Kobayashi | | |
| 2006/0119463 A1 * | 6/2006 | Kubota | .............. | H01H 85/2045 337/182 |
| 2007/0063809 A1 * | 3/2007 | Onoda | ................... | H01H 85/47 337/229 |
| 2007/0241857 A1 * | 10/2007 | Ito | ........................ | H01H 85/045 337/187 |
| 2010/0060407 A1 * | 3/2010 | Iwata | ................... | H01H 85/143 337/227 |
| 2014/0097932 A1 | 4/2014 | Füssl | | |
| 2017/0324233 A1 * | 11/2017 | Kimura | ................ | H01H 85/175 |

\* cited by examiner

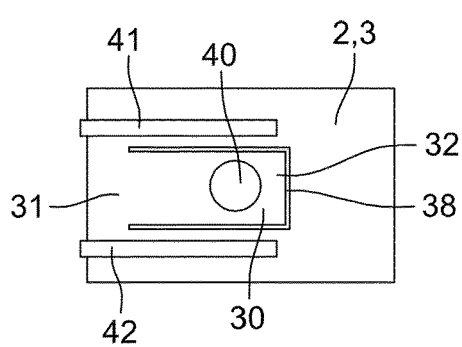
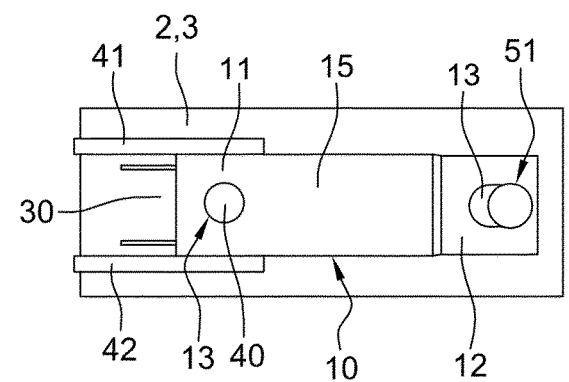
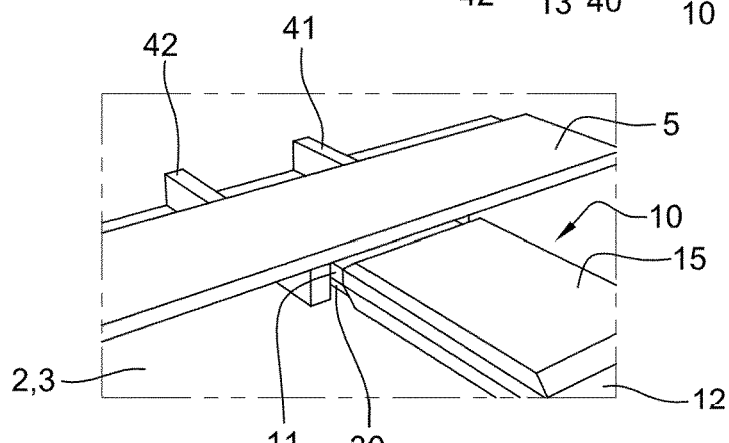
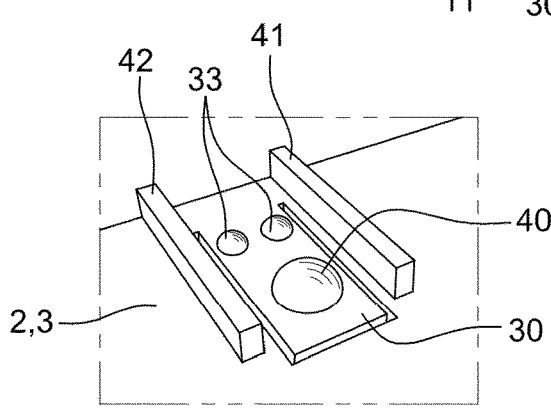
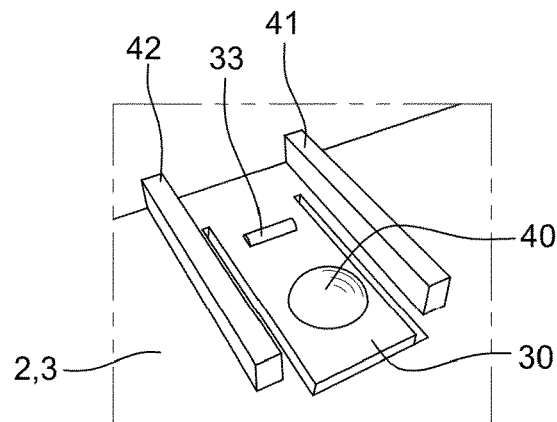
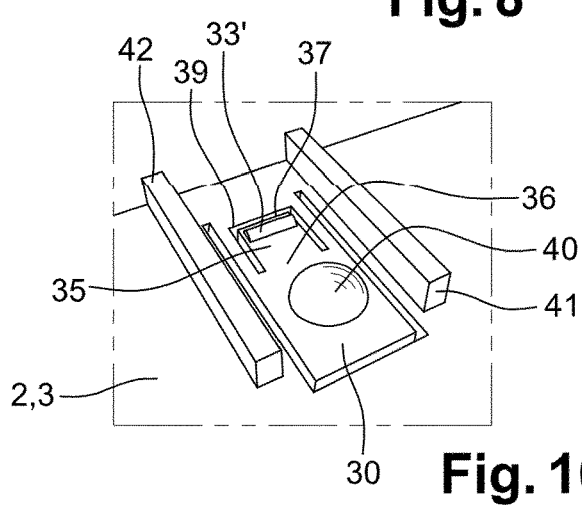
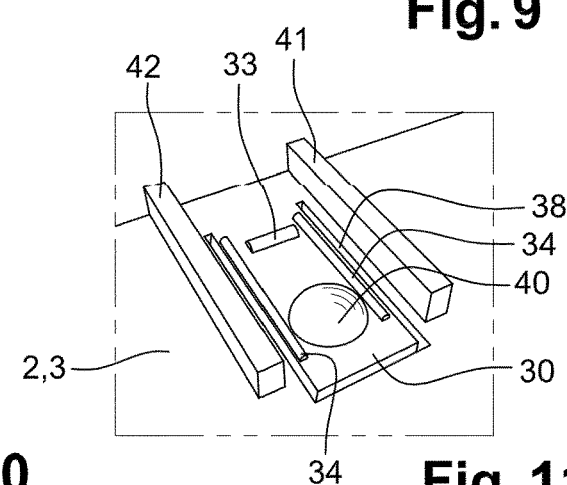

POWER DISTRIBUTION UNIT, SUCH AS A FUSE BOX FOR A VEHICLE

CROSS-REFERENCE TO RELATED APPLICATIONS

This application is a U.S. National Stage application of PCT/EP2018/057141, filed Mar. 21, 2018, and published on Sep. 26, 2019, as WO 2019/179614 A1, all of which is hereby incorporated by reference in its entirety.

TECHNICAL FIELD

The invention relates to a power distribution unit, such as a fuse box for a vehicle. The invention also relates to a housing for such a power distribution unit, to a bus bar for such a power distribution unit and to a vehicle comprising such a power distribution unit. The invention further relates to a process for mounting a fuse in such a power distribution unit.

The invention can be applied in light, medium and heavy-duty vehicles, such as passenger cars, trucks, buses and construction equipment.

BACKGROUND

In vehicles, electrical power is supplied from the battery or another power source to various components, for their operation. The electrical system of the vehicle generally includes a fuse box which acts as a power distribution unit. The fuse box provides a protected electrical connection between a power supply cable connected to the battery and a plurality of distribution cables, each connected to an electrical load, i.e. a component requiring electrical power.

A conventional fuse box comprises a housing receiving a bus bar connected to the power supply cable and a plurality of fuses. Each fuse typically comprises a body, a first end portion connected to the bus bar and a second end portion connected to a distribution cable. Most fuses used are the ones defined in ISO 8820 by SF30 and SF51 types. Such fuses have flat end portions which extend in opposite directions from the body and which include a hole so that they can be bolted in the housing.

Electrical connection boxes are described in US 2005/0026471 and EP 1 548 882.

In a known arrangement, a first bolt is used to connect the fuse first end portion and the bus bar and to secure them to the housing. To that end, a first screw equipped with a nut is inserted in the hole of the fuse first end portion, in a corresponding hole in the bus bar, and in a sleeve secured to the housing. Similarly, a second bolt is used to connect the fuse second end portion and the corresponding cable terminal, and to secure them to the housing, by means of a second screw, equipped with a nut, inserted in the hole of the fuse second end portion, in a corresponding hole in the cable terminal, and in a sleeve secured to the housing.

Manufacturing and assembling such a fuse box requires many steps, among which:
  making holes in the bus bar (e.g. by drilling or cutting);
  fitting sleeves in the housing (e.g. by insertion, overmoulding, screwing, etc.);
  for the first connection, generally performed by the fuse box supplier: mounting the bus bar, then the fuse, washer and nut with proper torque;
  for the second connection, generally performed by the vehicle manufacturer on final production line: mounting the cable, then the washer and nut with proper torque.

These steps require tools and are time consuming, all the more as one fuse box generally contains many fuses of different types/sizes.

In another known arrangement, the bus bar and the first end portions of the fuses are made as one single piece. Therefore, the process assembly is greatly facilitated as only one connection has to be done, namely the connection between the second end portion of the fuses and the corresponding cable terminal. However, in case one fuse is damaged or blown, the whole piece including the bus bar and all fuses (including the fuses that are still operational) has to be changed. Besides, this arrangement includes a specific piece including the bus bar and the fuses, based on ISO requirements, but does not include ISO fuses as previously mentioned.

There is therefore a need for an improved power distribution unit.

SUMMARY

An object of the invention is to provide a power distribution unit, such as a fuse box for a vehicle, which solves at least partially the problems of the prior art.

More specifically, an object of the invention is to provide a power distribution unit which allows improved assembly, and preferably flexibility and/or modularity.

To that end, according to a first aspect, the invention relates to a power distribution unit, such as a fuse box for a vehicle, for providing a protected electrical connection between a power supply cable and a plurality of distribution cables, the unit comprising a housing and, received in said housing:
  a bus bar configured to be connected to the power supply cable;
  a plurality of fuses, each fuse comprising a body, a first end portion configured to be connected to the bus bar, and a second end portion configured to be connected to a distribution cable;
the unit comprising:
  at least one retainer for maintaining the bus bar in position with respect to the housing;
  at least one positioner for positioning the fuse first end portion relative to the bus bar along directions substantially parallel to the bus bar;
  a biasing member configured to urge the fuse first end portion towards the bus bar, to cause the fuse first end portion to remain in contact with the bus bar.

The positioner(s) and the biasing member are configured such that the fuse first end portion is sandwiched and maintained between the bus bar and the housing, and the biasing member is configured to urge the fuse first end portion substantially orthogonally to and towards the bus bar.

Thus, the bus bar being maintained in position relative to the housing, owing to the positioner(s) and biasing member, the fuse first end portion can be mechanically linked and electrically connected to the bus bar, reversibly, without requiring bolts nor tools.

The invention therefore allows greatly improving the assembling/disassembling process (for both the bus bar and for the fuse), as well as the maintenance process (i.e. damaged fuse change). Indeed, the invention limits the time required for such a process and avoids the need to use losable parts such as fasteners or tools. Ultimately, this allows saving costs. This is all the more significant when a great number of fuses have to be connected in the power distribution unit, and/or when the power distribution unit contains different types of fuses (which generally requires different types of fasteners or tools for their connection).

The invention offers other significant advantages such as:
it makes it possible to use a simplified bus bar, as holes to tighten fuses might no longer be needed, at least in some embodiments of the invention;
standard fuses can still be used;
the improvement of the assembling/disassembling of the unit does not result in an increase in the cost of the tool used to manufacture the housing.

These advantages are not reached at the expense of electrical connection quality. In particular, the biasing member ensures the electrical contact between the fuse first end portion and the bus bar is properly maintained. The biasing member can be a spring exerting a pushing or a pulling force, or any elastic piece capable of being elastically deformed from its rest position, such as a deflectable, pivotable or deformable tongue, tab, leg, etc.

According to an embodiment, the retainer(s) and the positioner(s) may be separate parts.

As regards the positioner(s), it (they) can be part of the housing. In other words, the positioner(s) can be made as a single part with the housing, for example through a plastic injection process. Alternatively, the positioner(s) can be an initially separate part secured to the housing before use of the power distribution unit, preferably permanently secured to the housing; the positioner(s), for example as a formed metallic sheet, can be secured to the housing during a plastic injection process of the housing, or clipped to the housing once said housing has been manufactured.

The biasing member is part of the housing. In other words, the biasing member can be made as a single part with the housing, for example through a plastic injection process. Alternatively, the biasing member can be an initially separate part secured to the housing before use of the power distribution unit, preferably permanently secured to the housing; the biasing member, for example as a formed metallic sheet, can be secured to the housing during a plastic injection process of the housing, or clipped to the housing once said housing has been manufactured.

Besides, the retainer can be part of the housing.

The positioner(s) and the biasing member may be arranged on one and the same portion of the housing.

The fuse first end portion may comprise a hole, and in the positioner may comprise at least one protuberance configured to be engaged in said hole. The protuberance is preferably devoid of threads.

According to an embodiment, the housing may comprise a base wall, and a tab—as the biasing member—having one end linked to the base wall and a free end, the tab protruding, obliquely from the base wall when at rest, a receiving area being formed between the tab and the bus bar, wherein the tab is configured to be elastically deflected towards the base wall by the fuse first end portion when said fuse first end portion is inserted in the receiving area. The tab may form at least part of the biasing member. By "at rest" is meant that no mechanical constraint is exerted on the tab.

Such an arrangement allows a particularly easy assembling/disassembling process, as the fuse first end portion only has to be inserted, and possibly pushed, in the receiving area.

The protuberance can protrude from the tab towards the bus bar. In concrete terms, the protuberance can protrude towards the fuse first end portion.

The tab may further comprise at least one protrusion configured to contact one face of the fuse first end portion. Said face of the fuse first end portion is preferably directed towards the housing base wall, i.e. opposite the bus bar. Such a protrusion makes it possible to improve contact between the fuse first end portion and the bus bar, i.e. to improve the mechanical link and the electrical connection. The protrusion may prevent or greatly limit sliding between the fuse first end portion and the bus bar. The protrusion may have the shape of a bulge or a rib, such as a straight rib.

The tab may further comprise at least one stiffener, such as a rib. Such a stiffener may also make it possible to control the fuse contact pressure towards the bus bar and to secure proper electrical/mechanical connection.

The housing may further comprise a tongue having one end linked to the tab and a free end, the tongue protruding obliquely from the tab when at rest, preferably in a direction substantially opposite to the direction along which the tab protrudes from the housing base wall, the tongue being configured to be elastically deflected towards the tab by the fuse first end portion when said fuse first end portion is inserted in the receiving area. Such an implementation aims at further improving the contact between the fuse first end portion and the bus bar.

In an embodiment, the positioner(s) can comprise at least one guiding wall configured to contact a side face of the fuse first end portion. Preferably, the positioner(s) comprise(s) two parallel guiding walls arranged on both sides of the fuse first end portion and in contact with said fuse first end portion.

The at least one retainer may comprise at least one support which protrudes from the housing towards the bus bar, and on which the bus bar can rest. Such a support allows maintaining an appropriate distance between the bus bar and the housing, in the mounted position. As a consequence, this allows providing a receiving area large enough for receiving the fuse first end portion, and small enough to ensure satisfactory contact between the fuse first end portion and the bus bar.

The at least one retainer may comprise at least one snap member which is configured to cooperate with a bus bar edge portion in an engaged position, and which is elastically movable towards a release position to allow insertion/removal of the bus bar. A plurality of snap members may be provided on the bus bar periphery, at least part of them being movable towards a release position. Having such retainers, in combination with at least one support, provides a simple and efficient retaining system for maintaining the bus bar in position with respect to the housing.

The fuse second end portion can be secured to the housing by means of a fastener such as a bolt. This arrangement allows fully securing the assembly. The bolt may comprise a threaded sleeve secured to the housing and a screw inserted in said sleeve. A washer and/or spacer may further be provided.

According to a second aspect, the invention relates to a housing for a power distribution unit, such as a fuse box for a vehicle, configured to receive:
a bus bar to be connected to a power supply cable;
and a plurality of fuses to be connected to a plurality of distribution cables, each fuse having a first end portion configured to be connected to the bus bar;
the housing comprising:
a base wall;
at least one retainer for maintaining the bus bar in position with respect to the base wall;
a tab forming a biasing member, the tab having one end linked to the base wall and a free end, the tab protruding obliquely from the base wall when at rest, a receiving area being formed between the tab and the bus bar in use, wherein the tab is configured to be elastically deflected towards the base wall by the fuse first end portion when said fuse first end portion is inserted in the receiving area.

The housing may comprise any of the previously described features or combination of features.

According to a third aspect, the invention relates to a bus bar for a power distribution unit as previously described, the bus bar comprising:
- a supply portion configured to be connected to a power supply cable;
- a plurality of distribution portions each configured to be connected to a first end portion of a fuse, said first end portion comprising a hole, the distribution portions being devoid of any opening for receiving a fastener to be inserted in the hole of the fuse first end portion.

Indeed, in the power distribution unit of the invention, the fuse first end portion is positioned by means of the positioner and maintained in mechanical and electrical contact with the bus bar by means of the biasing member, no bolt being necessary for that purpose. As a result, no hole is to be provided in the bus bar for that purpose. Furthermore, the bus bar is maintained in position with respect to the housing via the retainer, which is not necessarily a bolt, meaning that no hole is necessary to secure the bus bar to the housing.

Having a bus bar devoid of holes, at least for assembling the fuse first end portion to the bus bar and preferably also for assembling the bus bar to the housing, is advantageous as it allows reducing the manufacturing cost of the bus bar.

According to a fourth aspect, the invention relates to a vehicle comprising a power distribution unit, a housing, or a bus bar as previously described.

According to a fifth aspect, the invention relates to a process for mounting a fuse in a power distribution unit as previously described, the process comprising:
- inserting a first end portion of the fuse in a receiving area arranged between the bus bar and a housing base wall;
- the fuse first end portion being positioned relative to the bus bar owing to the positioner and urged orthogonally to and towards the bus bar by the biasing member;
- securing the fuse second end portion to the housing base wall by means of a fastener such as a bolt.

The insertion step may include a tilting phase and a sliding phase of the fuse relative to the housing.

For example, the fuse first end portion is inserted in the receiving area formed between the bus bar and the tab, as the biasing member, until the protuberance is engaged in the hole of the first end portion.

Further advantages and advantageous features of the invention are disclosed in the following description and in the appended claims.

BRIEF DESCRIPTION OF THE DRAWINGS

With reference to the appended drawings, below follows a more detailed description of embodiments of the invention cited as examples.

In the drawings:

FIG. 5 is a detailed top view of the housing, showing an embodiment of the positioner and biasing member;

FIG. 6 is a view similar to FIG. 5, further showing a fuse in the mounted position;

FIG. 7 is a partial perspective view of a power distribution unit according to an embodiment of the invention;

FIG. 8 to 11 are detailed perspective views showing variants of the positioner and biasing member;

DETAILED DESCRIPTION OF EXAMPLE EMBODIMENTS OF THE INVENTION

Figure 1:
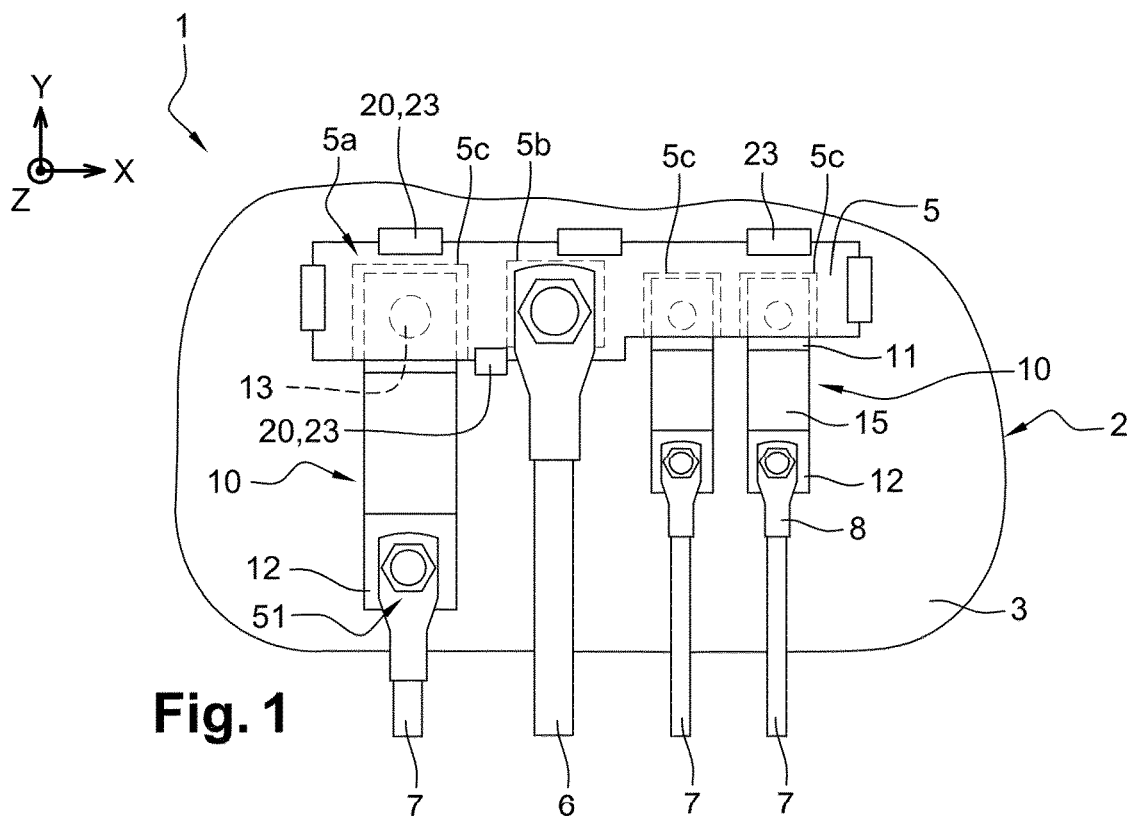
FIG. 1 is a partial top view of a power distribution unit according to an embodiment of the invention, comprising a housing, a bus bar and fuses.
Figure 2:
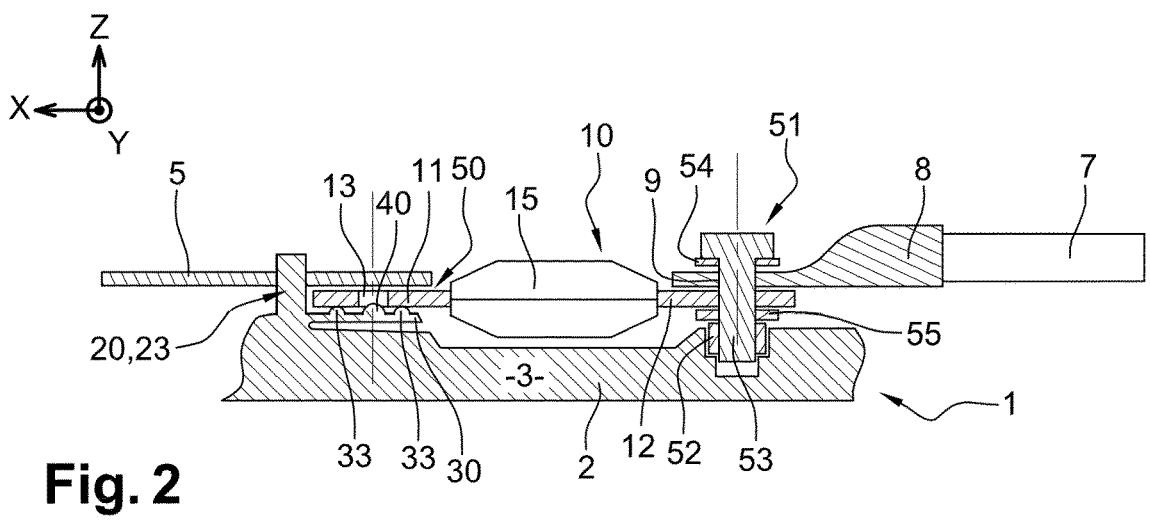
FIG. 2 is a partial side view of the unit of FIG. 1.

FIGS. 1 and 2 partially show a power distribution unit 1, typically a fuse box for a vehicle. Such a vehicle fuse box can be housed in the engine compartment, in the battery box, or in the chassis area.

The power distribution unit 1 comprises a housing 2 which is made of an insulating material, typically plastic, and can be injection moulded. The housing 2 can comprise a base wall 3 as well as, preferably, a peripheral wall and/or a cover (not shown).

The base wall 3 is not necessarily horizontal when the power distribution unit 1 is mounted in the vehicle. However, in view of simplification, the description will be made in case the house base wall 3 is horizontal. Direction Z is defined as the vertical direction (see FIGS. 1 and 2). The terms "upper", "lower" and analogous will be used with reference to said direction Z.

Figures 3, 4:
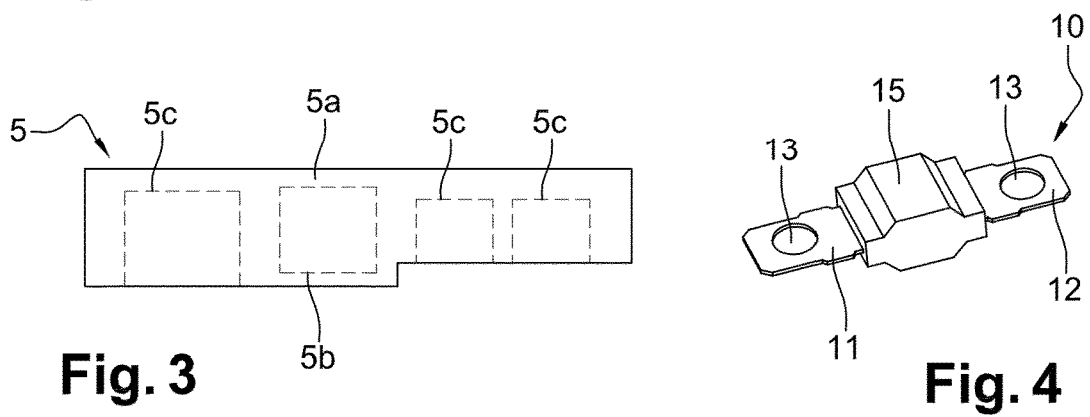
FIG. 3 is a top view of a bus bar according to an embodiment of the invention.
FIG. 4 is a perspective view of a fuse for use in a unit of the invention.

Inside the housing 2 is arranged a bus bar 5. The bus bar 5 is made of an electrically conductive material, typically a metal, for example copper or a copper alloy, with optionally a protected coating or surface treatment such as tin platting for example. Such a bus bar 5 is illustrated in FIG. 3. As shown in the figures, the bus bar 5 can typically be a flat plate-like member which, in the mounted position, is substantially parallel to the housing base wall 3. Direction X is defined as being orthogonal to Z and as being the direction along which the bus bar 5 extends, while direction Y is defined as being orthogonal to X and Z, i.e. corresponds to the transverse direction of the bus bar 5.

Besides, as can be seen in FIG. 3, the bus bar 5 according to the invention can be devoid of any holes for connecting the fuses, as will be explained later.

On the one hand, the bus bar 5 is configured to be connected to a power supply cable 6, by any appropriate means.

On the other hand, the bus bar 5 is configured to be connected to a plurality of fuses 10, inside the housing 2. Preferably, as illustrated in FIG. 4, each fuse 10 comprises a body 15, 35 which houses the active part of the fuse, and can be centrally arranged. The fuse 10 further comprises a first end portion 11 and a second end portion 12, which preferably extend oppositely from the body 15. The end portions 11, 12 are made of an electrically conductive material, typically metal. They can typically be plate shaped, and they preferably each include a hole 13. The fuse illustrated in FIG. 4 is of ISO SF30 type. However, other types of fuses can be used.

The first end portion 11 of one fuse 10 is configured to be connected to the bus bar 5, while the second end portion 12 of the fuse 10 is configured to be connected to a distribution cable 7. To that end, the corresponding end of the distribution cable 7 can be equipped with a terminal 8, such as a lug (i.e. a metallic part provided with a hole 9). Each distribution cable 7 is connected to an electrical load (not shown).

Consequently, the power distribution unit 1 provides a protected electrical connection between a power supply cable 6 and a plurality of distribution cables 7, by means of the bus bar 5 which connects all fuses 10 to the power supply cable 6. Owing to the power distribution unit 1, a single power supply can be distributed to various electrical loads through protected distribution lines.

The bus bar 5 includes a supply portion 5b configured to be connected to the power supply cable 6, and a plurality of distribution portions 5c each configured to be connected to a first end portion 11 of a fuse 10.

The power distribution unit 1 comprises retainers 20 for maintaining the bus bar 5 in position with respect to the housing 2.

The retainers 20 can be part of the housing 2. In the illustrated embodiment, the retainers 20 are moulded as a single part with the housing 2. Alternatively, the retainers 20, or at least one portion of each retainer 20, could be separate parts secured, preferably permanently secured, to the housing 2.

The retainers 20 can comprise one support 21, preferably several supports 21 on which the bus bar 5 can rest, in the mounted position. The supports 21 can protrude from the housing 2, typically from the housing base wall 3. They can have a substantially flat rest surface 22 so as to allow together supporting the bus bar 5 substantially parallel to the 35 housing base wall 3.

The retainers 20 can comprise at least one snap member 23, preferably in addition to the supports 21. The snap member 23 is configured to cooperate with a bus bar edge portion 5a in an engaged position, and is elastically movable towards a release position to allow insertion/removal of the bus bar 5. In an embodiment, there are provided several snap members 23 along the bus bar periphery.

Each snap member 23 can have a leg 24 protruding from the housing base wall 3 towards the bus bar 5, and a hook 25 extending from the free end of the leg 24, towards the bus bar 5. The hook 25 may have a lower face 26 substantially parallel to the housing base wall 3, for contacting the upper face of the bus bar 5 and locking it. The hook 25 may have an upper sloped face 27 for making assembly/disassembly of the bus bar 5 easier, as will be explained later. Preferably, the leg 24 of at least one snap member 23 is elastically deformable outwardly (i.e. moving away from the bus bar 5).

An opening 28 may be provided between a snap member 23 and a support 21. This opening 28, which may be necessary to form the hook 25 during the moulding process, may be used as a drainage hole.

The power distribution unit 1 further comprises a device for providing a satisfactory mechanical link and electrical connection between the fuse first end portion 11 and the bus bar 5. This device comprises:
- at least one positioner for positioning the fuse first end portion 11 relative to the bus bar 5 along directions X and Y;
- a biasing member configured to urge the fuse first end portion 11 towards the bus bar 5, i.e. substantially along direction Z.

According to an embodiment, the housing 2 comprises a tab 30 which has one end 31 linked to the housing base wall 3 and a free end 32. The tab 30 is located under the bus bar 5, in the mounted position, and protrudes obliquely from the base wall 3 when at rest. Thus, a receiving area 50 is formed between the tab 30 and the bus bar 5. Furthermore, preferably, the tab 30 can be elastically deflected towards the base wall 3 under an appropriate force. The tab 30 forms at least part of the biasing member for at least one fuse 10. The tab 30 can be rectangular. It can be delimited by a hollow U-shaped line 38 formed in the housing 2.

At least one protuberance 40 protrudes from the tab 30 towards the bus bar 5. The protuberance 40 is configured to be engaged in the hole 13 of the fuse first end portion 11, and thus forms at least part of the positioner. In the illustrated embodiments, the protuberance is hemispheric. However, other shapes can be envisaged, provided they make it possible to adequately position the fuse first end portion 11 relative to the bus bar 5, and preferably to improve fuse end portion 11 engagement/disengagement.

At least one guiding wall may be provided to contact a side face of the fuse first end portion 11. In the exemplary embodiment, there may be provided two parallel guiding walls 41, 42 protruding from the housing base wall 3, for enclosing the fuse first end portion 11 on both sides thereof. As shown in FIG. 5, the tab 30 is thus located between the guiding walls 41, 42. Said guiding walls 41, 42 form at least part of the positioner. They can be made as a single part with the housing 2, for example by injection moulding.

As shown in FIGS. 8 and 9, the tab 30 may comprise at least one protrusion 33 configured to contact the lower face of the fuse first end portion 11, for contributing to maintaining the fuse 10 relative to the housing 2. The protrusion 33 may be in the form of a bulge, for example a hemispheric bulge (FIG. 8). Alternatively, the protrusion 33 may comprise substantially straight ribs (FIG. 9), preferably arranged orthogonally to the direction along with the fuse end portions 11, 12 extend, to prevent slipping of the fuse 10. There may be provided a single protrusion 33 or several protrusions 33.

The tab 30 may further comprise stiffeners 34, such as ribs extending along the guiding walls 41, 42 (FIG. 11), to improve the tab rigidity.

An additional deformable element can further be provided, as shown in FIG. 10. In this implementation, there is provided a tongue 35 having one end 36 linked to the tab 30 and a free end 36, the tongue 35 protruding obliquely from the tab 30 when at rest, preferably in a direction substantially opposite to the direction along which the tab 30 protrudes from the housing base wall 3. The tongue 35 can be delimited by a hollow U-shaped line 39 formed in the tab 30. The tongue 35 is configured to be elastically deflected towards the tab 30 under an appropriate force. An additional protrusion 33' can project from the tongue 35, said additional protrusion 33' being configured to contact the lower face of the fuse first end portion 11.

The tab 30, as well as, preferably, the protuberance 40, protrusions 33, 33' stiffeners 34, and/or tongue 35, can be made as a single part with the housing 2, for example by injection moulding.

The process for assembling the power distribution unit 1 will now be described.

In a first step, as shown in FIGS. 12a to 13b, the bus bar 5 is mounted in the housing 2, and maintained relative to the base wall 3.

Figure 12A:
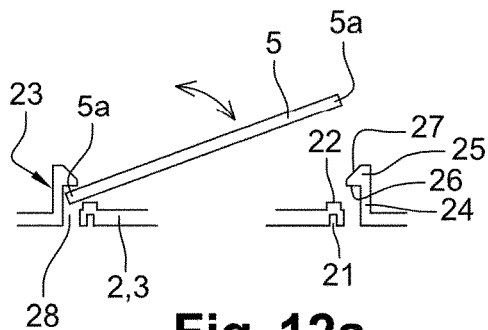
FIGS. 12a to 12c show successive steps for assembling the bus bar to the housing.
Figure 12B:
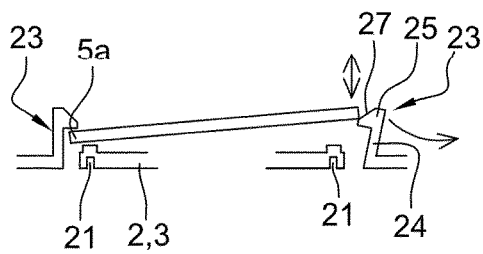
Figure 12C:
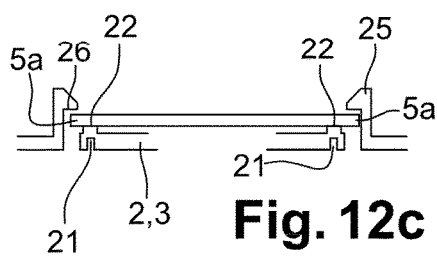

To that end, according to a first possible assembling method illustrated in FIGS. 12a to 12c, one edge of the bus bar 5 is inserted between a support 21 and a snap member 23 (FIG. 12a). Then, the bus bar 5 is pivoted so that the opposite edge of the bus bar 5 contacts the upper sloped face 27 of a snap member 23, forcing the leg 24 to deflect outwardly to allow further insertion of the bus bar 5 (FIG.

12b). When the bus bar 5 is in the mounted position (FIG. 12c), it rests on the rest surfaces 22 of the supports 21, and the snap members 23, having elastically returned towards their rest position, lock the bus bar 5 relative to the housing base wall 3.

Figure 13A:
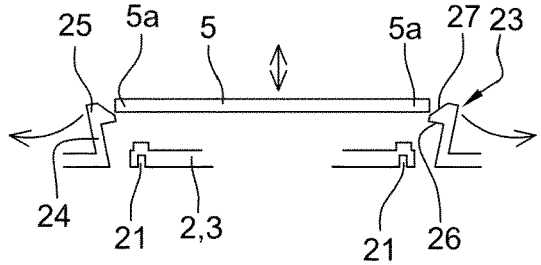
FIGS. 13a and 13b show successive steps of an alternative method for assembling the bus bar to the housing.
Figure 13B:
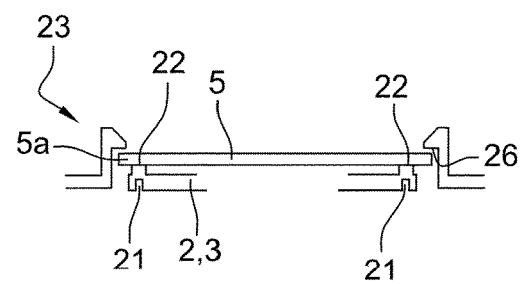

Alternatively, according to a second possible assembling method illustrated in FIGS. 13a and 13b, the bus bar 5 can be placed parallel to the housing base wall 3 and moved towards said base wall 3 along direction Z, causing opposed snap members 23 to deflect simultaneously (FIG. 13a) until the bus bar 5 is locked under the lower faces 26 of the hooks 25 (FIG. 13b).

With such methods, no hole is necessary in the bus bas 5 for receiving a fastener to secure the bus bar 5 relative to the housing 2.

In a second step, as shown in FIGS. 14a to 14d, one fuse 10 is connected to the bus bar 5, to the corresponding distribution cable 7, and fully secured to the housing 2. The same step 30 is carried out for each fuse 10 in the housing 2.

Figure 14A:
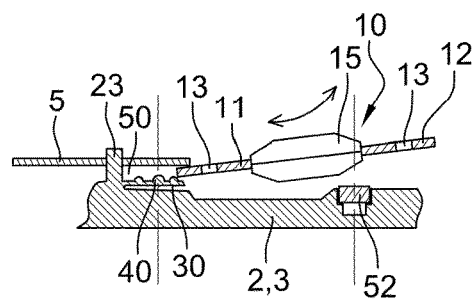
FIGS. 14a to 14d show successive steps for assembling the fuse in the unit.
Figure 14B:
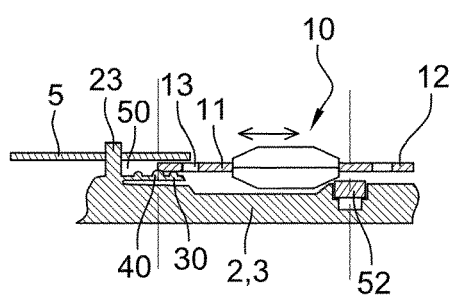
Figure 14C:
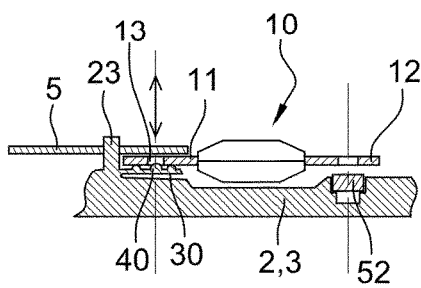

As shown in FIGS. 14a and 14b, the first end portion 11 of the fuse 10 is inserted between the bus bar 5 and the housing base wall 3. To that end, the fuse 10 is first tilted (FIG. 14a), and then pushed by a sliding movement orthogonally to direction Z (FIG. 14b), until the 35 fuse first end portion 11 is appropriately positioned relative to the bus bar 5.

With the previously described exemplary embodiment, the fuse first end portion 11 is inserted in the receiving area 50 formed between the bus bar 5 and the tab 30, being guided between the guiding walls 41, 42, until the protuberance 40 is engaged in the hole 13 of the first end portion 11. In this position (FIG. 14c), the protuberance 40 acting as a positioner, the fuse 10 is adequately positioned in the housing 2, especially relative to the bus bar 5. It has to be noted that the protuberance 40 does not extend upwardly beyond the fuse first end portion 11, otherwise it would alter good electrical contact between the fuse first end portion 11 and the bus bar 5.

During this insertion, the fuse first end portion 11 has caused the tab 30 to elastically deflect towards the base wall 3. As a consequence, in the mounted position of the fuse first end portion 11 in the receiving area 50 (FIG. 14c), the fuse first end portion 11 is urged towards the bus bar 5 by the tab 30 acting as a biasing member. The fuse first end portion 11 is thus sandwiched and maintained between the bus bar 5 and the housing 2, which ensures good contact pressure for electrical connection, and preferably also for mechanical link.

Figure 14D:
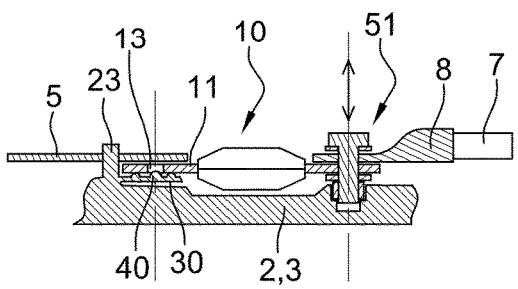

Then, the fuse second end portion 12 is secured to the housing base wall 3 by means of a fastener 51, as shown in FIG. 14d. This phase allows fully securing the assembly. The fastener 51 may be a bolt. It may comprise a threaded sleeve 52 secured to the housing base wall 3 and a screw 53 inserted in said sleeve 52, with a predetermined torque. A washer 54 and/or spacer 55 may further be provided.

Owing to the invention, as can be seen on FIG. 3, each of the distribution portions 5c of the bus bar 5 configured to be connected to a first end portion 11 of a fuse 10 can be devoid of any opening for receiving a fastener to be inserted in the hole 13 of the fuse first end portion 11. This is particularly advantageous as it greatly decreases the manufacturing cost of the bus bar 5.

The invention therefore provides a power distribution unit allowing easy, quick, safe and stable mechanical link and electrical connection between a fuse and a bus bar. As a consequence, the invention gives rise to significant cost savings.

It is to be understood that the present invention is not limited to the embodiments described above and illustrated in the drawings; rather, the skilled person will recognize that many changes and modifications may be made within the scope of the appended claims.

The invention claimed is:

1. A power distribution unit, for providing a protected electrical connection between a power supply cable and a plurality of distribution cables, the unit comprising a housing and, received in said housing: a bus bar configured to be connected to the power supply cable, a plurality of fuses, each fuse comprising a body, a first end portion configured to configured to be connected to a distribution cable; wherein the unit comprises: at least one retainer for maintaining the bus bar in position with respect to the housing; at least one positioner for positioning the fuse first end portion relative to the bus bar along directions substantially parallel to the bus bar; a biasing member configured to urge the fuse first end portion towards the bus bar, to cause the fuse first end portion to remain in contact with the bus bar, wherein the positioner and the biasing member are configured such that the fuse first end portion is sandwiched and maintained between the bus bar and the housing, and wherein the biasing member is configured to urge the fuse first end portion substantially along direction, orthogonally to and towards the bus bar.

2. The unit according to claim 1, wherein the retainer and the positioner are separate parts.

3. The unit according to claim 1, wherein the positioner is part of the housing.

4. The unit according to claim 1, wherein the biasing member is part of the housing.

5. The unit according to claim 1, wherein the positioner and the biasing member are arranged on one and the same portion of the housing.

6. The unit according to claim 1, wherein the fuse first end portion comprises a hole, and in that the positioner comprise at least one protuberance configured to be engaged in said hole.

7. The unit according to claim 1, wherein the housing comprises a base wall, and further comprises a tab as the biasing member, the tab having one end to the base wall and a free end, the tab protruding obliquely from the base wall when at rest, a receiving area being formed between the tab and the bus bar, wherein the tab is configured to be elastically deflected towards the base wall by the fuse first end portion when said fuse first end portion is inserted in the receiving area.

8. The unit according to claim 7, wherein the protuberance protrudes from the tab towards the bus bar.

9. The unit according to claim 7, wherein the tab further comprises at least one protrusion configured to contact one face of the fuse first end portion.

10. The unit according to claim 7, wherein the housing further comprises a tongue having one end linked to the tab and a free end, the tongue protruding obliquely from the tab when at rest, in a direction substantially opposite to the direction along which the tab protrudes from the housing base wall, the tongue being configured to be elastically deflected towards the tab by the fuse first end portion when said fuse first end portion is inserted in the receiving area.

11. The unit according to claim 1, wherein the positioner comprise at least one guiding wall configured to contact a side face of the fuse first end portion.

12. The unit according to claim 1, wherein the at least one retainer comprises at least one support which protrudes from the housing towards the bus bar and on which the bus bar can rest.

13. The unit according to claim 1, wherein the at least one retainer comprises at least one snap member which is configured to cooperate with a bus bar edge portions in an engaged position, and which is elastically movable towards a release position to allow insertion/removal of the bus bar.

14. The unit according to claim 1, wherein the fuse second end portion is secured to the housing by means of a fastener.

15. A vehicle, wherein it comprises the power distribution unit according to claim 1, or the housing, or the bus bar.

16. A process for mounting the fuse in the power distribution unit according to claim 1, the process comprising:
   inserting the first end portion of the fuse in a receiving area arranged between the bus bar and a housing base wall;
   the fuse first end portion being positioned relative to the bus bar owing to the positioner and urged orthogonally to and towards the bus bar by the biasing member, securing the fuse second end portion to the housing base wall by means of a fastener.

17. The process according to claim 16, with the power distribution unit, wherein the fuse first end portion is inserted in the receiving area formed between the bus bar and the tab, as the biasing member, until the protuberance is engaged in the hole of the first end portion.

18. A housing for a power distribution unit, configured to receive:
   a bus bar to be connected to a power supply cable;
   and a plurality of fuses to be connected to a plurality of distribution cables, each fuse having a first end portion configured to be connected to the bus bar;
wherein the housing comprises:
   a base wall;
   at least one retainer for maintaining the bus bar in position with respect to the base wall;
   a tab forming a biasing member, the tab having one end linked to the base wall and a free end, the tab protruding obliquely from the base wall when at rest, a receiving area being formed between the tab and the bus bar in use, wherein the tab is configured to be elastically deflected towards the base wall by the fuse first end portion when said fuse first end portion is inserted in the receiving area.

* * * * *